(12) United States Patent
Huang

(10) Patent No.: US 11,490,024 B2
(45) Date of Patent: Nov. 1, 2022

(54) METHOD FOR IMAGING CONTROLLING, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Jiewen Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 70 days.

(21) Appl. No.: 17/164,108

(22) Filed: Feb. 1, 2021

(65) Prior Publication Data

US 2021/0160416 A1     May 27, 2021

Related U.S. Application Data

(63) Continuation of application No. PCT/CN2019/088243, filed on May 24, 2019.

(30) Foreign Application Priority Data

Aug. 13, 2018   (CN) .......................... 201810916172.1

(51) Int. Cl.
*H04N 5/235* (2006.01)
*G06T 5/00* (2006.01)
*G06T 5/50* (2006.01)

(52) U.S. Cl.
CPC ........... *H04N 5/2351* (2013.01); *G06T 5/002* (2013.01); *G06T 5/50* (2013.01); *H04N 5/2353* (2013.01); *H04N 5/2355* (2013.01); *G06T 2207/10024* (2013.01); *G06T 2207/20221* (2013.01)

(58) Field of Classification Search
None
See application file for complete search history.

(56) References Cited

U.S. PATENT DOCUMENTS

| 2014/0152694 A1 | 6/2014 | Narasimha et al. |
| 2015/0163423 A1 | 6/2015 | Yin et al. |

(Continued)

FOREIGN PATENT DOCUMENTS

| CN | 102075688 | 5/2011 |
| CN | 103222259 | 7/2013 |

(Continued)

OTHER PUBLICATIONS

EPO, Extended European Search Report for EP Application No. 19849301.7, dated Oct. 13, 2021.

(Continued)

*Primary Examiner* — James M Hannett
(74) *Attorney, Agent, or Firm* — Hodgson Russ LLP

(57) ABSTRACT

A method for imaging controlling is applied to an electronic device. The electronic device includes a pixel-unit array that includes multiple photosensitive pixel units. The method includes the following. If an exposure ratio of a long-exposure pixel in a shooting scene to a short-exposure pixel in the shooting scene is larger than a first exposure-ratio threshold and brightness in the shooting scene is larger than a brightness threshold, in each photosensitive pixel unit, control a long-exposure pixel, a medium-exposure pixel, and a short-exposure pixel to output original pixel information in conditions of different exposure time correspondingly. In each photosensitive pixel unit, select the original pixel information of the long-exposure pixel, the original pixel information of the medium-exposure pixel, or the original pixel information of the short-exposure pixel. Image according to the selected original pixel information.

20 Claims, 8 Drawing Sheets

(56) References Cited

U.S. PATENT DOCUMENTS

| | | | | |
|---|---|---|---|---|
| 2017/0034413 A1* | 2/2017 | Lin | ............... | H04N 5/2351 |
| 2018/0041724 A1* | 2/2018 | Kim | ............... | H04N 5/353 |
| 2019/0213722 A1* | 7/2019 | Fujimoto | ............ | G06T 5/50 |
| 2020/0112666 A1* | 4/2020 | Fujimoto | ............ | H04N 5/243 |

FOREIGN PATENT DOCUMENTS

| | | |
|---|---|---|
| CN | 103973989 | 8/2014 |
| CN | 104836947 | 8/2015 |
| CN | 104869320 | 8/2015 |
| CN | 105578075 | 5/2016 |
| CN | 106303269 | 1/2017 |
| CN | 107040730 | 8/2017 |
| CN | 108200354 | 6/2018 |
| CN | 108270977 | 7/2018 |
| CN | 108322669 | 7/2018 |
| EP | 3537710 | 9/2019 |

OTHER PUBLICATIONS

SIPO, First Office Action for CN Application No. 201810916172.1, dated Aug. 5, 2019.
SIPO, Notification to Grant Patent Right for Invention for CN Application No. 201810916172.1, dated Nov. 27, 2019.
WIPO, ISR for PCT/CN2019/088243, dated Aug. 26, 2019.
EPO, Partial Supplementary European Search Report for EP Application No. 19849301.7, dated Jul. 2, 2021.

* cited by examiner

|   | 1 | 2 | 3 | 4 | 5 | 6 | 7 | 8 |
|---|---|---|---|---|---|---|---|---|
| 1 | R (L) | R (M) | G (L) | G (M) | R (L) | R (M) | G (L) | G (M) |
| 2 | R (M) | R (S) | G (M) | G (S) | R (M) | R (S) | G (M) | G (S) |
| 3 | G (L) | G (M) | B (L) | B (M) | G (L) | G (M) | B (L) | B (M) |
| 4 | G (M) | G (S) | B (M) | B (S) | G (M) | G (S) | B (M) | B (S) |
| 5 | R (L) | R (M) | G (L) | G (M) | R (L) | R (M) | G (L) | G (M) |
| 6 | R (M) | R (S) | G (M) | G (S) | R (M) | R (S) | G (M) | G (S) |
| 7 | G (L) | G (M) | B (L) | B (M) | G (L) | G (M) | B (L) | B (M) |
| 8 | G (M) | G (S) | B (M) | B (S) | G (M) | G (S) | B (M) | B (S) |

FIG. 3

METHOD FOR IMAGING CONTROLLING, ELECTRONIC DEVICE, AND NON-TRANSITORY COMPUTER-READABLE STORAGE MEDIUM

CROSS-REFERENCE TO RELATED APPLICATION(S)

This application is a continuation of International Application No. PCT/CN2019/088243, filed on May 24, 2019, which claims priority to Chinese Patent Application No. 201810916172.1, filed on Aug. 13, 2018, the entire disclosures of which are incorporated by reference herein.

TECHNICAL FIELD

This disclosure relates to the technical field of electronic devices, and particularly to a method for imaging controlling, an electronic device, and a non-transitory computer-readable storage medium.

BACKGROUND

With continuous development of terminal technology, electronic devices are increasingly used by users to capture images. In a backlighting scene, when a front camera of an electronic device is used by a user to take a selfie, since the user locates between a light source and the electronic device, it is easy to cause insufficient exposure of a face. If brightness of the face is increased by adjusting exposure, a background area is overexposed, and a shooting scene cannot even be displayed clearly.

Generally, in order to improve shooting quality in high-dynamic-range scenes such as the backlighting scene, in a shooting process, a method of synthesizing images with different exposure degrees is used to improve an imaging effect of an image.

However, imaging quality of the image captured in this way may change with shooting scenes. In some shooting scenes, although the dynamic range is relatively large, an ideal effect cannot be realized. Therefore, this single shooting mode cannot be applied to multiple shooting scenes.

SUMMARY

The present disclosure proposes a method for imaging controlling, an electronic device, and a non-transitory computer-readable storage medium.

In an implementation of the present disclosure, a method for imaging controlling is provided. The method is applied to an electronic device. The electronic device includes a pixel-unit array. The pixel-unit array includes multiple photosensitive pixel units. Each photosensitive pixel unit includes at least one long-exposure pixel, at least one medium-exposure pixel, and at least one short-exposure pixel. The method includes the following. Determine whether an exposure ratio of the at least one long-exposure pixel in a shooting scene to the at least one short-exposure pixel in the shooting scene is larger than a first exposure-ratio threshold, in response to brightness in the shooting scene larger than a brightness threshold. In each photosensitive pixel unit, control the at least one long-exposure pixel, the at least one medium-exposure pixel, and the at least one short-exposure pixel to output original pixel information in conditions of different exposure time correspondingly, in response to the exposure ratio of the at least one long-exposure pixel in the shooting scene to the at least one short-exposure pixel in the shooting scene larger than the first exposure-ratio threshold. In each photosensitive pixel unit, select the original pixel information of the at least one long-exposure pixel, the original pixel information of the at least one medium-exposure pixel, or the original pixel information of the at least one short-exposure pixel. Image according to the selected original pixel information.

In another implementation of the present disclosure, an electronic device is provided. The electronic device includes a memory configured to store at least one computer program, and a processor. The at least one computer program, when executed, is operable with the processor to perform the following. Determine whether an exposure ratio of the at least one long-exposure pixel in a shooting scene to the at least one short-exposure pixel in the shooting scene is larger than a first exposure-ratio threshold, in response to brightness in the shooting scene larger than a brightness threshold. In each photosensitive pixel unit, control the at least one long-exposure pixel, the at least one medium-exposure pixel, and the at least one short-exposure pixel to output original pixel information in conditions of different exposure time correspondingly, in response to the exposure ratio of the at least one long-exposure pixel in the shooting scene to the at least one short-exposure pixel in the shooting scene larger than the first exposure-ratio threshold. In each photosensitive pixel unit, select the original pixel information of the at least one long-exposure pixel, the original pixel information of the at least one medium-exposure pixel, or the original pixel information of the at least one short-exposure pixel. Image according to the selected original pixel information.

In yet another implementation of the present disclosure, a non-transitory computer-readable storage medium is provided. The storage medium is configured to store at least one computer program. The at least one computer program, when executed, is operable with a processor of an electronic device to perform the following. Determine whether an exposure ratio of the at least one long-exposure pixel in a shooting scene to the at least one short-exposure pixel in the shooting scene is larger than a first exposure-ratio threshold, in response to brightness in the shooting scene larger than a brightness threshold. In each photosensitive pixel unit, control the at least one long-exposure pixel, the at least one medium-exposure pixel, and the at least one short-exposure pixel to output original pixel information in conditions of different exposure time correspondingly, in response to the exposure ratio of the at least one long-exposure pixel in the shooting scene to the at least one short-exposure pixel in the shooting scene larger than the first exposure-ratio threshold. In each photosensitive pixel unit, select the original pixel information of the at least one long-exposure pixel, the original pixel information of the at least one medium-exposure pixel, or the original pixel information of the at least one short-exposure pixel. Image according to the selected original pixel information.

BRIEF DESCRIPTION OF THE DRAWINGS

The above-mentioned and/or additional aspects and advantages of the present disclosure will become apparent and be easily understood according to description of implementations in conjunction with accompanying drawings.

FIG. 3 is a schematic structural diagram illustrating a pixel-unit array of an electronic device according to an implementation of the present disclosure.

DETAILED DESCRIPTION

Figure 1:
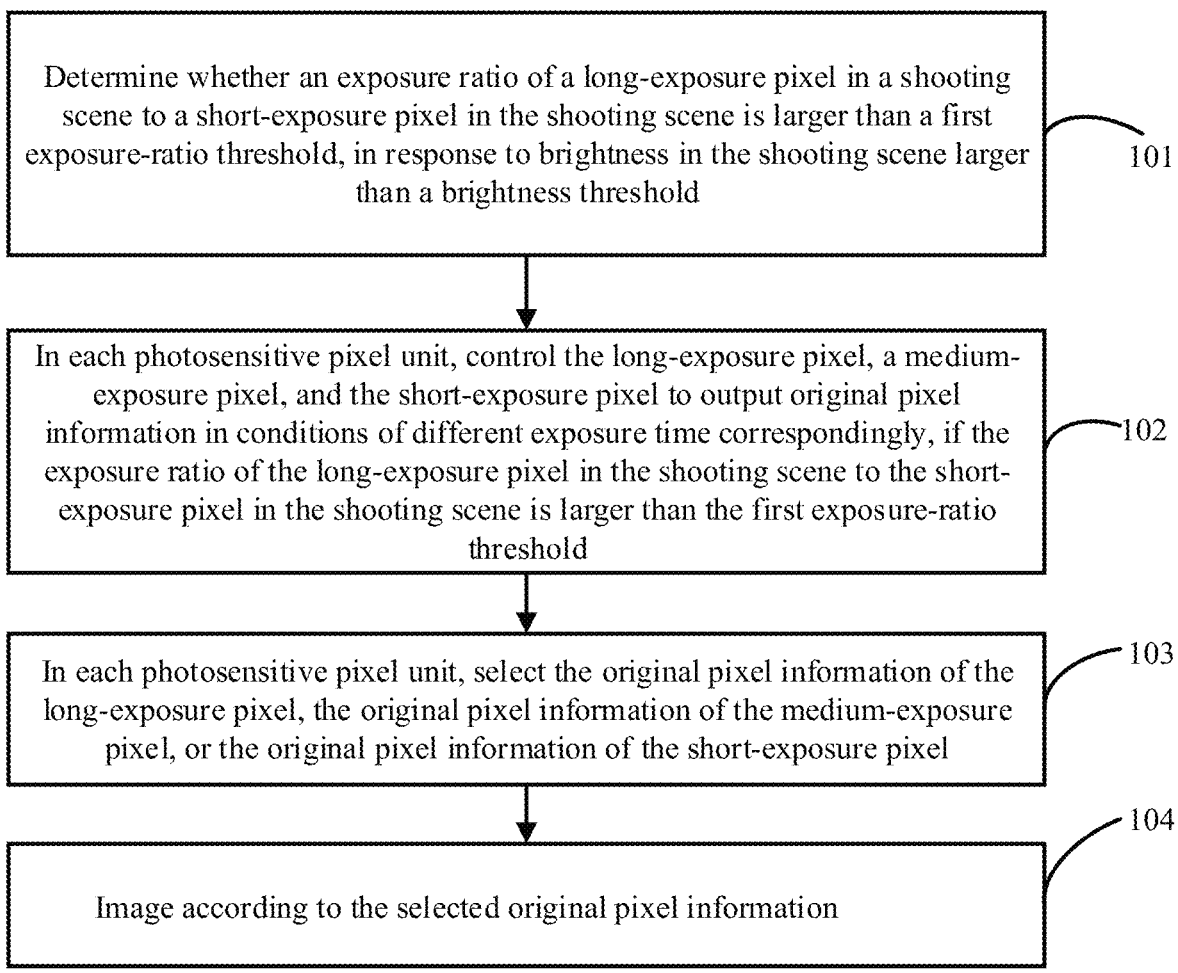
FIG. 1 is a schematic flow chart illustrating a method for imaging controlling according to an implementation of the present disclosure.

The following describes implementations of the present disclosure in detail. Examples of the implementations are illustrated in accompanying drawings, where throughout the specification the same or like reference numerals represent the same or like elements or elements having the same or similar functions. The implementations described below with reference to the accompanying drawings are exemplary and merely intended to explain the disclosure, rather than being understood as a limitation on the present disclosure.

In the related art, in order to improve shooting quality in high-dynamic-range scenes such as a backlighting scene, in a shooting process, a pixel array is controlled to be subject to long exposure, medium exposure, and short exposure, respectively, and then images obtained in conditions of different exposure time are synthesized to output an image, thereby improving an imaging effect of the image. In some shooting scenes, although the dynamic range is relatively large, a resolution and signal-to-noise ratio of an image are relatively low, and thus an ideal shooting effect cannot be achieved.

In view of the above problems, in the present disclosure a method for imaging controlling is provided. According to the method, determine whether an exposure ratio of a long-exposure pixel in a shooting scene to a short-exposure pixel in the shooting scene is larger than a first exposure-ratio threshold, in response to brightness in the shooting scene larger than a brightness threshold. In each photosensitive pixel unit, control the long-exposure pixel, a medium-exposure pixel, and the short-exposure pixel to output original pixel information in conditions of different exposure time correspondingly, in response to the exposure ratio of the long-exposure pixel in the shooting scene to the short-exposure pixel in the shooting scene larger than the first exposure-ratio threshold. In each photosensitive pixel unit, select the original pixel information of the long-exposure pixel, the original pixel information of the medium-exposure pixel, or the original pixel information of the short-exposure pixel. Image according to the selected original pixel information.

The following will describe a method and device for imaging controlling according to an implementation of the present disclosure with reference to the accompanying drawings.

FIG. 1 is a schematic flow chart illustrating a method for imaging controlling according to an implementation of the present disclosure.

Figure 2:
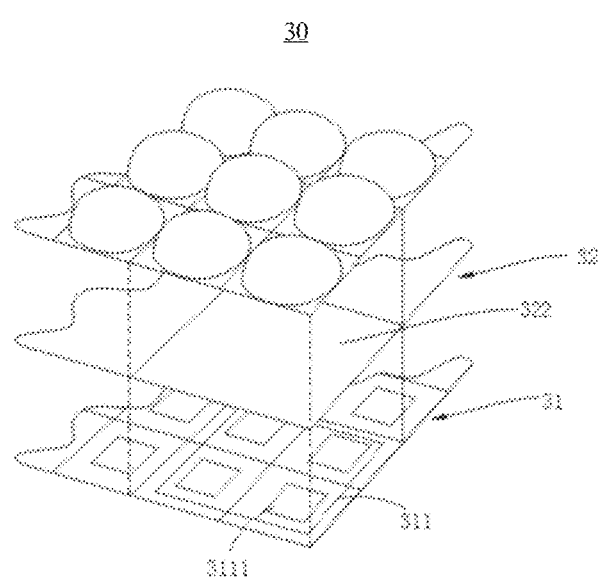
FIG. 2 is a schematic structural diagram illustrating part of an electronic device according to an implementation of the present disclosure.

The method for imaging controlling in the implementation of the present disclosure is applied to an electronic device. Referring to FIG. 2, an electronic device 30 includes a pixel-unit array 31 and a filter-unit array 32 disposed on the pixel-unit array 31. The pixel-unit array 31 includes multiple photosensitive pixel units 311, and each photosensitive pixel unit 311 includes multiple photosensitive pixels 3111. The filter-unit array 32 includes multiple filter units 322 corresponding to the multiple photosensitive pixel units 311, and each filter unit 322 covers a corresponding photosensitive pixel unit 311. Each photosensitive pixel unit 311 in the pixel-unit array 31 includes at least one long-exposure pixel, at least one medium-exposure pixel, and at least one short-exposure pixel.

As illustrated in FIG. 1, the method for imaging controlling includes the following.

At block 101, determine whether an exposure ratio of the long-exposure pixel in a shooting scene to the short-exposure pixel in the shooting scene is larger than a first exposure-ratio threshold, in response to brightness in the shooting scene larger than a brightness threshold.

In an implementation of the present disclosure, an International Organization for Standardization (ISO) value or exposure time for the electronic device to capture a preview image in the shooting scene is first obtained, where the ISO value is indicative of a light sensitivity of a camera. If the obtained ISO value or exposure time in the shooting scene is smaller than a corresponding first parameter threshold, it is determined that the shooting scene is a bright environment. The first ISO threshold can be set to be 200, and the first exposure-time threshold can be set to be 30 ms.

The ISO value for capturing the preview image in the shooting scene can be obtained in various manners. In an implementation, the photosensitive pixels in the pixel-unit array can be controlled to measure the light sensitivity for capturing the preview image in the shooting scene.

In an implementation, an independent light-measurement device can be used to measure the light sensitivity for capturing the preview image in the shooting scene.

In an implementation, the ISO value for capturing the preview image in the shooting scene can be obtained by reading an ISO value automatically adjusted by the camera of the electronic device.

What needs to be illustrated is that the ISO value is indicative of the light sensitivity of the camera. ISO values commonly used are 50, 100, 200, 400, 1000, and so on. The camera can automatically adjust the ISO value according to ambient brightness. Therefore, in the implementation, the ambient brightness in the shooting environment can be deduced according to the ISO value.

In an implementation of the present disclosure, the exposure time can be preset in a built-in program of the electronic device, or can be set by a user, and then the electronic device can obtain the exposure time for capturing the preview image in the shooting scene.

In an implementation, when the obtained ISO value or the exposure time in the shooting scene is smaller than the corresponding parameter threshold, the shooting scene is determined to be the bright environment with the brightness larger than the brightness threshold. In the current shooting scene, the exposure ratio of the long-exposure pixel to the short-exposure pixel is calculated. If the obtained exposure ratio is larger than the first exposure-ratio threshold, the current shooting scenario is determined to be a high-dynamic-range scene. For example, in the shooting scene, the ISO threshold can be set to be 400, and the exposure time threshold can be set to be 30 ms.

The brightness threshold refers to preset brightness for determining whether the shooting scene is a bright environment with medium-high brightness. The brightness threshold can be preset in the built-in program of the electronic device or set by the user. The first exposure-ratio threshold refers to a preset threshold for determining a dynamic range of the shooting scene according to the exposure ratio of the long-exposure pixel in the shooting scene to the short-exposure pixel in the shooting scene.

At block 102, in each photosensitive pixel unit, control the long-exposure pixel, the medium-exposure pixel, and the short-exposure pixel to output original pixel information in conditions of different exposure time correspondingly, if the exposure ratio of the long-exposure pixel in the shooting scene to the short-exposure pixel in the shooting scene is larger than the first exposure-ratio threshold.

In an implementation of the present disclosure, the pixel-unit array 31 includes the photosensitive pixel units 311, and each photosensitive pixel unit 311 includes the at least one long-exposure pixel, the at least one medium-exposure pixel, and the at least one short-exposure pixel. Therefore, the original pixel information output by the pixel-unit array 31 includes the original pixel information of the long-exposure pixel, the original pixel information of the medium-exposure pixel, and the original pixel information of the short-exposure pixel.

As an example, as illustrated in FIG. 3, each photosensitive pixel unit 311 in the pixel-unit array 31 of the electronic device includes four photosensitive pixels 3111, and the four photosensitive pixels 3111 are arranged in a 2*2 array. The four photosensitive pixels 3111 in each photosensitive pixel unit 311 are respectively one long-exposure pixel, two medium-exposure pixels, and one short-exposure pixel. In this case, the original pixel information output by the pixel-unit array 31 includes original pixel information of the one long-exposure pixel, original pixel information of the two medium-exposure pixels, and original pixel information of the one short-exposure pixel. Of course, in other implementations, the number of the long-exposure pixel(s), the medium-exposure pixel(s), and the short-exposure pixel(s) in each photosensitive pixel unit 311 can also be other values.

In an implementation, after determining that the current shooting scene is a medium-high dynamic-range scene, in each photosensitive pixel unit, the electronic device first controls the long-exposure pixel to be subject to exposure, and then controls the medium-exposure pixel and the short-exposure pixel to be subject to exposure during the exposure of the long-exposure pixel. An end time of the exposure of the medium-exposure pixel and the short-exposure pixel need to be the same as that of the long-exposure pixel or before the end time of the exposure of the long-exposure pixel. In another implementation, in each photosensitive pixel unit, the long-exposure pixel, the medium-exposure pixel, and the short-exposure pixel are controlled to be subject to exposure simultaneously, that is, a starting time of the exposure of the long-exposure pixel, the medium-exposure pixel, and the short-exposure pixel are the same. In this way, the pixel-unit array can be controlled to output multiple pieces of original pixel information in conditions of different exposure time correspondingly, without controlling the pixel-unit array to be subject to long exposure, medium exposure, and short exposure in sequence.

The long-exposure pixel refers to one photosensitive pixel exposure time of which is long exposure time, the medium-exposure pixel refers to one photosensitive pixel exposure time of which is medium exposure time, and the short-exposure pixel refers to one photosensitive pixel exposure time of which is short exposure time, where the long exposure time of the long-exposure pixel is longer than the medium exposure time of medium-exposure pixel, and the medium exposure time of the medium-exposure pixel is longer than the short exposure time of the short-exposure pixel.

After the exposure ends, each photosensitive pixel unit 311 outputs four pieces of original pixel information. Taking the red photosensitive pixel unit 311 illustrated in FIG. 3 as an example, the four pieces of original pixel information includes original pixel information of a long-exposure pixel R(1,1), original pixel information of a medium-exposure pixel R(1,2), original pixel information of a medium-exposure pixel R(2,1), and original pixel information of a short-exposure pixel R(2,2).

At block 103, in each photosensitive pixel unit, select the original pixel information of the long-exposure pixel, the original pixel information of the short-exposure pixel, or the original pixel information of the medium-exposure pixel.

Since each photosensitive pixel unit 311 includes the at least one long-exposure pixel, the at least one medium-exposure pixel, and the at least one short-exposure pixel, select the original pixel information of the long-exposure pixel, the original pixel information of the short-exposure pixel, or the original pixel information of the medium-exposure pixel as original pixel information.

As an example, each photosensitive pixel unit 311 includes one long-exposure pixel, two medium-exposure pixels, and one short-exposure pixel. The original pixel information of the long-exposure pixel is 80, the original pixel information of the short-exposure pixel is 255, and the original pixel information of each medium-exposure pixel is also 255. Since an upper limit of the original pixel information is 255, it means that the original pixel information of the medium-exposure pixel and the original pixel information of the short-exposure pixel are both overexposure pixel information, and thus the original pixel information (80) of the long-exposure pixel can be selected.

At block 104, image according to the selected original pixel information.

In an implementation, in each photosensitive pixel unit 311, according to the selected original pixel information, i.e., the original pixel information of the long-exposure pixel, the original pixel information of the short-exposure pixel, or the original pixel information of the medium-exposure pixel, as well as an exposure ratio of the long exposure time to the medium exposure time to the short exposure time (i.e., an exposure ratio of the long exposure time to the medium exposure time, an exposure ratio of the medium exposure time to the short exposure time, and an exposure ratio of the long exposure time to the short exposure time), synthesized pixel information can be calculated. For example, different weights can be assigned to the three pieces of original pixel information in conditions of three kinds of exposure time correspondingly, and then the selected original pixel information is multiplied by a corresponding weight to obtain the synthesized pixel information.

Still taking the above as an example, assuming that the exposure ratio of the long exposure time to the medium exposure time to the short exposure time is 16:4:1, the synthesized pixel information is 1280 obtained by 80*16.

Furthermore, according to the obtained synthesized pixel information corresponding to each photosensitive pixel unit 311 in the pixel-unit array 31, the electronic device can output a high-dynamic-range image. In such a case, the output image has a relatively good imaging effect.

According to the method for imaging controlling in the implementation of the present disclosure, determine whether the exposure ratio of the long-exposure pixel in the shooting scene to the short-exposure pixel in the shooting scene is larger than the first exposure-ratio threshold, in response to the brightness in the shooting scene larger than the brightness threshold. In each photosensitive pixel unit, control the long-exposure pixel, the medium-exposure pixel, and the short-exposure pixel to output original pixel information in conditions of different exposure time correspondingly, in response to the exposure ratio of the long-exposure pixel in the shooting scene to the short-exposure pixel in the shooting scene larger than the first exposure-ratio threshold. In each photosensitive pixel unit, select the original pixel information of the long-exposure pixel, the original pixel information of the medium-exposure pixel, or the original pixel information of the short-exposure pixel. Image according to the selected original pixel information. Therefore, by controlling the pixel-unit array to output the original pixel information in conditions of different exposure time correspondingly and synthesizing the original pixel information, a high-dynamic-range image is output, which improves an imaging effect, image quality, and user's shooting experience.

Figure 4:
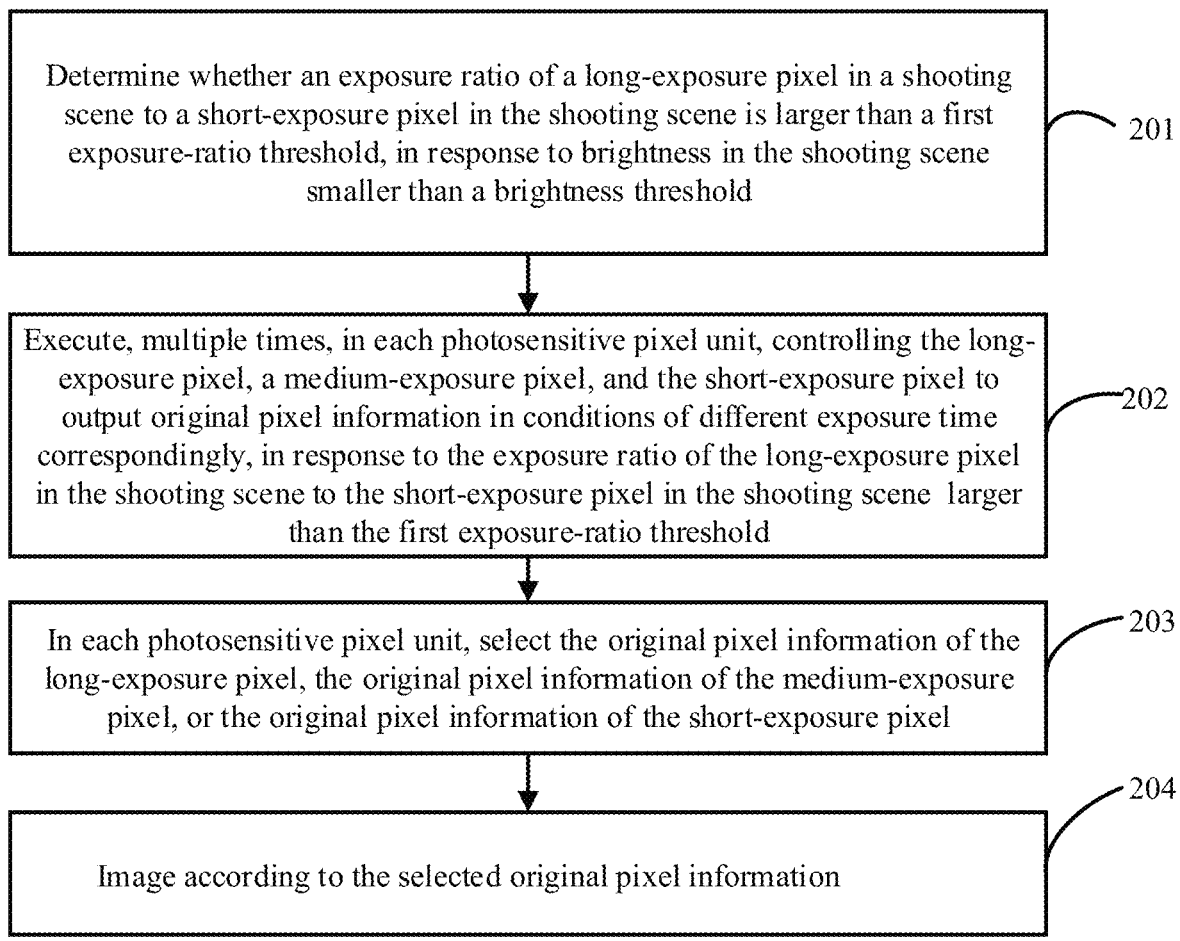
FIG. 4 is a schematic flow chart illustrating a method for imaging controlling according to another implementation of the present disclosure.

In another shooting scene, when ambient brightness in the shooting scene is relatively low, a clear high-dynamic-range image cannot be obtained by a single shooting. Therefore, the electronic device needs to perform, multiple times, controlling the pixel-unit array to output original pixel information in conditions of different exposure time correspondingly, and then imaging according to selected original pixel information. Referring to FIG. 4, a detailed process of imaging controlling is illustrated in FIG. 4.

As illustrated in FIG. 4, the method for imaging controlling includes the following.

At block 201, determine whether an exposure ratio of the long-exposure pixel in a shooting scene to the short-exposure pixel in the shooting scene is larger than a first exposure-ratio threshold, in response to brightness in the shooting scene smaller than a brightness threshold.

In the implementation of the present disclosure, a manner of determining whether the exposure ratio of the long-exposure pixel in the shooting scene to the short-exposure pixel in the shooting scene is larger than the first exposure-ratio threshold is the same as that described at block 101 in the above implementation, which will not be repeated herein.

At block 202, in response to the exposure ratio of the long-exposure pixel in the shooting scene to the short-exposure pixel in the shooting scene is larger than the first exposure-ratio threshold, execute, multiple times, in each photosensitive pixel unit, controlling the long-exposure pixel, the medium-exposure pixel, and the short-exposure pixel to output original pixel information in conditions of different exposure time correspondingly.

In the implementation of the present disclosure, when the shooting scene is a high-dynamic-range dark environment, a relatively good imaging effect cannot be realized by a single shooting. Thus, the electronic device needs to execute, multiple times, in each photosensitive pixel unit, controlling the long-exposure pixel, the medium-exposure pixel, and the short-exposure pixel to output the original pixel information in conditions of different exposure time correspondingly, where the electronic device executes the operation at least two times.

In an implementation, for a manner in which the electronic device controls, in each photosensitive pixel unit, the long-exposure pixel, the medium-exposure pixel, and the short-exposure pixel to output the original pixel information in conditions of different kinds of exposure time correspondingly, references can be made to the description at block 102 in the above implementation, which will not be repeated herein.

At block 203, after each execution (i.e., each time control, in each photosensitive pixel unit, the long-exposure pixel, the medium-exposure pixel, and the short-exposure pixel to output the original pixel information in conditions of different exposure time correspondingly), in each photosensitive pixel unit, select the original pixel information of the long-exposure pixel, the original pixel information of the short-exposure pixel, or the original pixel information of the medium-exposure pixel.

In the implementation of the present disclosure, in each photosensitive pixel unit, for a manner of selecting the original pixel information, reference can be made to the description at block 103 in the above implementation, which will not be repeated herein.

At block 204, image according to the selected original pixel information.

In an implementation, in each photosensitive pixel unit, the original pixel information of the long-exposure pixel, the original pixel information of the short-exposure pixel, or the original pixel information of the medium-exposure pixel is selected as the original pixel information. According to the selected original pixel information and an exposure ratio of long exposure time to medium exposure time to short exposure time, synthesized pixel information is calculated. For a specific calculation process, reference can be made to the description at block 104 in the aforementioned implementation, which will not be repeated herein.

For example, different weights can be assigned to three pieces of original pixel information in conditions of three kinds of exposure time correspondingly, and then the selected original pixel information is multiplied by a corresponding weight to obtain the synthesized pixel information.

Further, according to the synthesized pixel information obtained by each execution of the electronic device, a corresponding first image is generated, and then a synthesizing processing is performed on at least two first images generated by at least two executions. A processor of the electronic device performs a noise-reduction processing on an image obtained by performing the synthesizing processing on the at least two first images to obtain a low-noise image, and then outputs an image (i.e., the low-noise image) obtained by performing the synthesizing and noise-reduction processing on the at least two first images. In such a case, the output high-dynamic-range image has relatively low noise.

According to the method for imaging controlling in the implementation of the present disclosure, when the brightness in the shooting scene is smaller than the brightness threshold, and the exposure ratio of the long-exposure pixel in the shooting scene to the short-exposure pixel in the shooting scene is larger than the first exposure-ratio threshold, execute, multiple times, in each photosensitive pixel unit, controlling the long-exposure pixel, the medium-exposure pixel, and the short-exposure pixel to output the original pixel information in conditions of different exposure time correspondingly, and after each execution, in each photosensitive pixel unit, select the original pixel information of the long-exposure pixel, the original pixel information of the short-exposure pixel or the original pixel information of the medium-exposure pixel, and image according to the selected original pixel information. Therefore, by executing, multiple times, controlling each photosensitive pixel unit to output the original pixel information for imaging, and then perform the synthesizing and noise-reduction processing on multiple images generated by multiple executions, and thus a resolution of an image is increased and a signal-to-noise ratio of the image is reduced.

Figure 5:
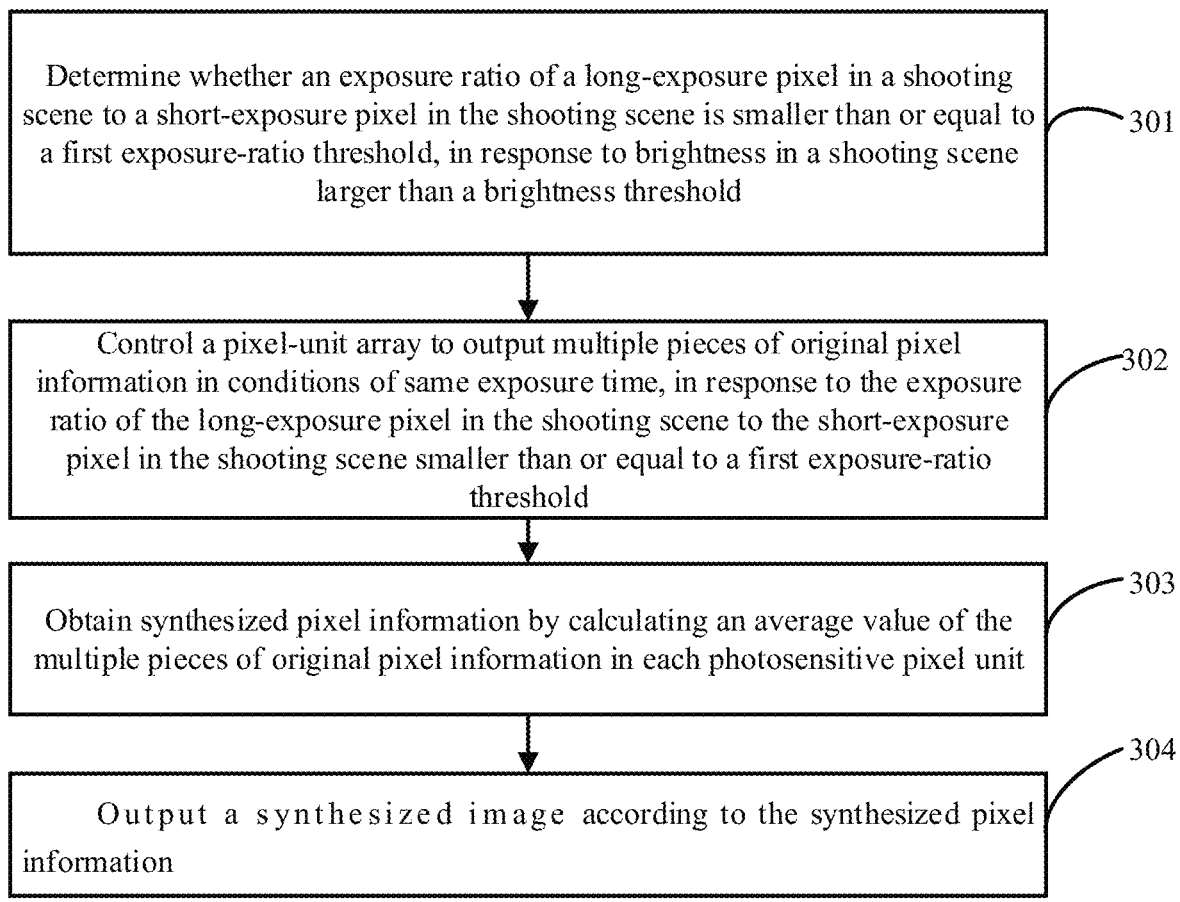
FIG. 5 is a schematic flow chart illustrating a method for imaging controlling according to yet another implementation of the present disclosure.

In another shooting scene, when an exposure ratio in the shooting scene is smaller than or equal to a first exposure-ratio threshold, the pixel-unit array is controlled to output multiple pieces of original pixel information in conditions of same exposure time, and then synthesized pixel information is calculated to perform imaging. Referring to FIG. 5, a detailed process of imaging controlling is illustrated in FIG. 5.

As illustrated in FIG. 5, the method for imaging controlling includes the following.

At block 301, in response to brightness in a shooting scene larger than a brightness threshold, determine whether an exposure ratio of the long-exposure pixel in the shooting scene to the short-exposure pixel in the shooting scene is smaller than or equal to a first exposure-ratio threshold.

In the implementation of the present disclosure, for a manner of obtaining an ISO value or exposure time in the shooting scene, reference can be made to the description at block 101 in the above implementation, which will not be repeated herein.

Furthermore, in the current shooting scene, calculate the exposure ratio of the long-exposure pixel to the short-exposure pixel, determine whether the exposure ratio in the shooting scene is smaller than or equal to the first exposure-ratio threshold, and determine whether the exposure ratio in the shooting scene is larger than a second exposure-ratio threshold. The second exposure-ratio threshold is smaller than the first exposure ratio threshold.

When the exposure ratio in the shooting scene is smaller than or equal to the first exposure-ratio threshold and larger than the second exposure-ratio threshold, the shooting scene is determined to be a medium-low dynamic-range scene.

At block 302, control the pixel-unit array to output multiple pieces of original pixel information in conditions of same exposure time, in response to the exposure ratio of the long-exposure pixel in the shooting scene to the short-exposure pixel in the shooting scene smaller than or equal to a first exposure-ratio threshold.

In the implementation, the electronic device controls the long-exposure pixel, the short-exposure pixel, and the medium-exposure pixel in the pixel-unit array to be subject to exposure the same exposure time. After the exposure, in each photosensitive pixel unit, original pixel information of the long-exposure pixel, original pixel information of the short-exposure pixel, and original pixel information of the medium-exposure pixel are obtained.

It should be noted that whether the pixel-unit array is controlled to be subject to exposure the same exposure time or different exposure time is determined according to ambient brightness in the shooting scene. Herein, only an example is illustrated, and there is no limitation on selection of the exposure time.

At block 303, obtain synthesized pixel information by calculating an average value of multiple pieces of original pixel information in each photosensitive pixel unit. Each photosensitive pixel unit corresponds to one piece of synthesized pixel information.

In an implementation, in each photosensitive pixel unit, calculate the average value of the original pixel information of the long-exposure pixel, the original pixel information of the short-exposure pixel, and the original pixel information of the medium-exposure pixel to obtain the synthesized pixel information. Each photosensitive pixel unit corresponds to one piece of synthesized pixel information.

As an example, take the red photosensitive pixel unit illustrated in FIG. 3 as an example, R(1,1) refers to the long-exposure pixel, R(1,2) and R(2,1) refer to the medium-exposure pixels, and R(2,2) refer to the short-exposure pixel. The processor of the electronic device first controls the long-exposure pixel R(1,1), the medium-exposure pixels R(1,2) and R(2,1), and the short-exposure pixel R(2,2) to be subject to exposure simultaneously. After the exposure, the red photosensitive pixel unit outputs four pieces of original pixel information, namely original pixel information of the long-exposure pixel R(1,1), original pixel information of the medium-exposure pixel R(1,2), original pixel information of the medium-exposure pixel R(2,1), and original pixel information of the short-exposure pixel R(2,2). In this way, the processor controls all the photosensitive pixels in each photosensitive pixel unit to be subject to exposure simultaneously in the above-mentioned manner, and obtains multiple pieces of original pixel information.

Further, the processor of the electronic device performs a synthesizing calculation on the multiple pieces of original pixel information, such that multiple pieces of synthesized pixel information are obtained. The synthesized pixel information is calculated with the following:

$$\frac{[R(1, 1) + R(2, 1)] + [R(1, 2) + R(2, 2)]}{2}.$$

In this way, the processor of the electronic device can calculate the synthesized pixel information corresponding to each photosensitive pixel unit in the pixel-unit array.

At block 304, output a synthesized image according to the synthesized pixel information.

In an implementation, the processor of the electronic device can calculate the synthesized pixel information in the manner described at block 303, and then output the synthesized image according to the synthesized pixel information.

In another implementation, when the exposure ratio in the shooting scene is smaller than the second exposure-ratio threshold and target processing duration in the shooting scene is shorter than or equal to a duration threshold, the shooting scene is determined to be a low-dynamic-range scene, and a restored image can be output according to restored pixel information corresponding to the synthesized pixel information.

Figure 6:
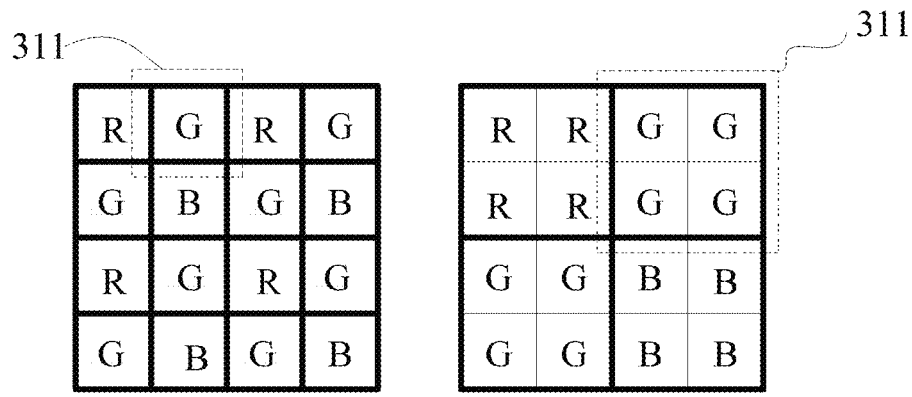
FIG. 6 is a schematic structural diagram illustrating a photosensitive pixel unit of an electronic device according to an implementation of the present disclosure.

Further, when the exposure ratio in the shooting scene is smaller than the second exposure-ratio threshold, and the target processing duration in the shooting scene is shorter than or equal to the duration threshold, the shooting scene is determined to be the bright environment with sufficient light, and thus a resolution effect caused by high pixels is relatively obvious. Therefore, for each piece of synthesized pixel information, at least two pieces of corresponding restored pixel information are determined. One piece of synthesized pixel information corresponds to one color, and at least two pieces of restored pixel information determined corresponding to each piece of synthesized pixel information correspond to at least two colors. For example, synthesized pixel information corresponding to a photosensitive pixel unit on the left side of FIG. 6 is restored to three pieces of restored pixel information corresponding to three colors. For example, each large pixel of 2.0 μm on the left side of FIG. 6 can be restored to be four pixels of 1.0 μm arranged in the sequence of GRBG. Finally, output the restored image according to each determined piece of restored pixel information, thereby improving image resolution and outputting a relatively clear low-dynamic image.

In an implementation, the target processing duration refers to duration of obtaining a dynamic-range image by photographing in the current shooting scene. The duration threshold is preset in the electronic device in response to user input.

According to the method of imaging controlling in the implementation of the present disclosure, when the brightness in the shooting scene is larger than the brightness threshold, and the exposure ratio of the long-exposure pixel in the shooting scene to the short-exposure pixel in the shooting scene is smaller than or equal to the first exposure-ratio threshold, the pixel-unit array is controlled to output multiple pieces of original pixel information in conditions of same exposure time, and the average value of the multiple pieces of original pixel information in each photosensitive pixel unit is calculated to obtain the synthesized pixel information. Each photosensitive pixel unit corresponds to one piece of synthesized pixel information. Finally, output the synthesized image according to the synthesized pixel information. As a result, in the medium-low dynamic-range scene that is relatively bright, according to the synthesized pixel information obtained by the original pixel information in each photosensitive pixel unit, obtain a medium-low dynamic-range image, thereby improving imaging effect, image quality, and user's shooting experience while ensuring the dynamic range.

Figure 7:
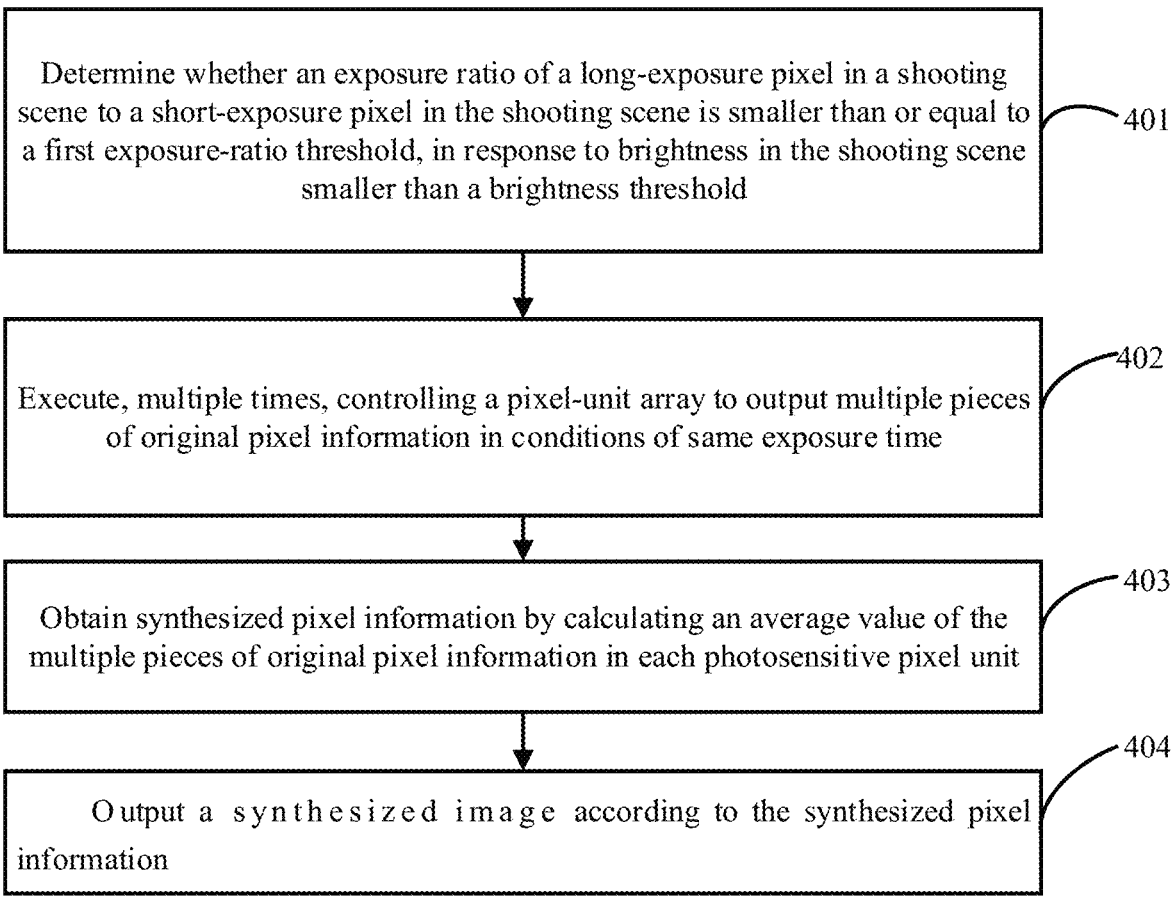
FIG. 7 is a schematic flow chart illustrating a method for imaging controlling according to yet another implementation of the present disclosure.

In an implementation, when a shooting scene is relatively dark, the electronic device needs to execute, multiple times, controlling the pixel-unit array to output multiple pieces of original pixel information in conditions of same exposure time, and synthesized pixel information is obtained by calculating an average value of the multiple pieces of original pixel information in each photosensitive pixel unit, and then output the synthesized image according to the synthesized pixel information. FIG. 7 is a schematic flow chart illustrating a method for imaging controlling according to an implementation of the present disclosure.

As illustrated in FIG. 7, the method for imaging controlling includes the following.

At block 401, determine whether an exposure ratio of the long-exposure pixel in a shooting scene to the short-exposure pixel in the shooting scene is smaller than or equal to a first exposure-ratio threshold, in response to brightness in the shooting scene smaller than a brightness threshold.

In the implementation of the present disclosure, for a manner of determining whether the exposure ratio of the long-exposure pixel in the shooting scene to the short-exposure pixel in the shooting scene is smaller than or equal to the first exposure-ratio threshold, reference can be made to the descriptions at block 101 in the above-mentioned implementation, which will not be repeated herein.

At block 402, the electronic device executes, multiple times, controlling the pixel-unit array to output multiple pieces of original pixel information in conditions of same exposure time.

In the implementation, when the shooting scene is a medium-low dynamic-range dark scene, that is, the exposure ratio of the long-exposure pixel in the shooting scene to the short-exposure pixel in the shooting scene is smaller than or equal to the first exposure-ratio threshold and the brightness in the shooting scene is smaller than the brightness threshold, an image acquired by a single shot executed by the electronic device may have a large overexposure part or a very dark part. Therefore, it is necessary to execute, multiple times, controlling the pixel-unit array to output multiple pieces of original pixel information in conditions of same exposure time, and then multiple images are obtained by synthesizing the multiple pieces of pixel information.

In an implementation, the electronic device executes, multiple times, controlling the long-exposure pixel, the short-exposure pixel, and the medium-exposure pixel in the pixel-unit array to be subject to exposure the same exposure time. After the exposure, in the photosensitive pixel unit, original pixel information of the long-exposure pixel, original pixel information of the short-exposure pixel, and original pixel information of the medium-exposure pixel are obtained. During multiple executions, the electronic device adopts two kinds of exposure time to obtain the original pixel information of the pixel-unit array.

In an implementation, multiple kinds of exposure time adopted for multiple executions of obtaining the original pixel information of the pixel-unit array by the electronic device are different from each other.

In an implementation, the multiple kinds of exposure time adopted for the multiple executions of obtaining the original pixel information of the pixel-unit array by the electronic device may include several kinds of exposure time that are the same and one kind of overlong exposure time.

At block 403, obtain synthesized pixel information by calculating an average value of original pixel information in each photosensitive pixel unit.

In the implementation, for a manner of obtaining the synthesized pixel information by calculating the average value of the original pixel information in each photosensitive pixel unit, reference can be made to the descriptions at block 303 in the above-mentioned implementation, which will not be repeated herein.

At block 404, output a synthesized image according to the synthesized pixel information.

In an implementation, according to the synthesized pixel information obtained by each execution, a corresponding second image is generated. When the medium-high dynamic-range shooting scene is relatively dark, a captured image has noise, so it is necessary to perform a synthesizing and noise-reduction processing on multiple second images generated by multiple executions, and an image (i.e., synthesized image) obtained by performing the synthesizing and noise-reduction processing on the multiple second images is output.

In an implementation, when the multiple kinds of exposure time adopted for multiple executions of obtaining the original pixel information in the pixel-unit array by the electronic device are different from each other, exposure degrees of multiple images generated according to the synthesized pixel information obtained by each execution are different from each other.

In an implementation, when the multiple kinds of exposure time adopted for the multiple executions of obtaining the original pixel information in the pixel-unit array by the electronic device include several kinds of exposure time that are the same and one kind of overlong exposure time, several images with the same exposure degree and one overexposed image are generated according to the synthesized pixel information obtained by each execution.

According to the method for imaging controlling in the implementation of the present disclosure, execute, multiple times, controlling the pixel-unit array to output multiple pieces of original pixel information in conditions of same exposure time, calculate the average value of original pixel information in each photosensitive pixel unit to obtain the synthesized pixel information, and output the synthesized image according to the synthesized pixel information. According to the method, when the electronic device execute, multiple times, controlling the pixel-unit array to output multiple pieces of original pixel information, multiple images with different exposure degrees are obtained in conditions of different exposure time, and perform the synthesizing and noise-reduction processing on the multiple images, and thus noise can be well controlled in the shooting scene, thereby improving imaging effect and definition, and further improving user's experience.

Figure 8:
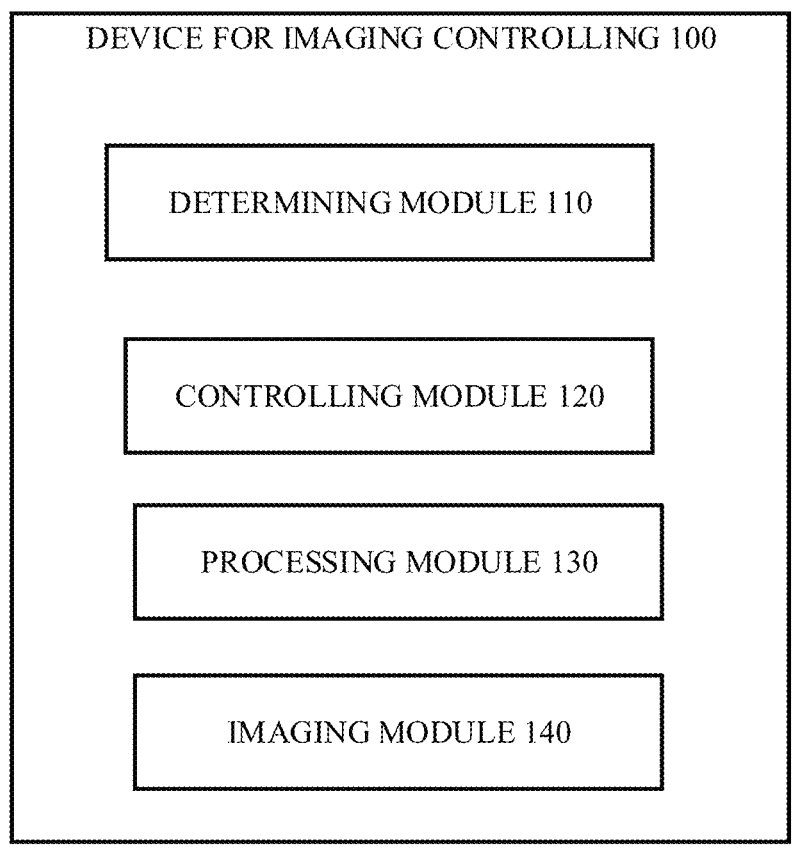
FIG. 8 is a schematic structural diagram illustrating a device for imaging controlling according to an implementation of the present disclosure.

FIG. 8 is a schematic structural diagram illustrating a device for imaging controlling according to an implementation of the present disclosure.

As illustrated in FIG. 8, a device 100 for imaging controlling includes a determining module 110, a controlling module 120, a processing module 130, and an imaging module 140.

The determining module 110 is configured to determine whether an exposure ratio of the long-exposure pixel in the shooting scene to the short-exposure pixel in the shooting scene is larger than a first exposure-ratio threshold, in response to brightness in the shooting scene larger than a brightness threshold.

The controlling module 120 is configured to control, in each photosensitive pixel unit, the at least one long-exposure pixel, the at least one medium-exposure pixel, and the at least one short-exposure pixel to output original pixel information in conditions of different exposure time correspondingly, in response to the exposure ratio of the long-exposure pixel in the shooting scene to the short-exposure pixel in the shooting scene larger than the brightness threshold.

The processing module 130 is configured to select, in each photosensitive pixel unit, the original pixel information of the at least one long-exposure pixel, the original pixel information of the at least one medium-exposure pixel, or the original pixel information of the at least one short-exposure pixel.

The imaging module 140 is configured to image according to the selected original pixel information.

In an implementation, the imaging module 140 is further configured to calculate, for each photosensitive pixel unit, synthesized pixel information according to the selected original pixel information and an exposure ratio of long exposure time to medium exposure time to short exposure time (i.e., an exposure ratio of the long exposure time to the medium exposure time, an exposure ratio of the medium exposure time to the short exposure time, and an exposure ratio of the long exposure time to the short exposure time), and image according to the synthesized pixel information.

In an implementation, the device 100 for imaging controlling further includes a first controlling module, a first processing module, and a first imaging module.

The first controlling module is configured to execute, multiple times, in each photosensitive pixel unit, controlling the at least one long-exposure pixel, the at least one medium-exposure pixel, and the at least one short-exposure pixel to output the original pixel information in conditions of different exposure time correspondingly, in response to the brightness in the shooting scene smaller than the brightness threshold.

The first processing module is configured to select, in each photosensitive pixel unit, the original pixel information of the at least one long-exposure pixel, the original pixel information of the at least one medium-exposure pixel, or the original pixel information of the at least one short-exposure pixel, after each execution (i.e., each time control, in each photosensitive pixel unit, the long-exposure pixel, the medium-exposure pixel, and the short-exposure pixel to output the original pixel information in conditions of different exposure time correspondingly).

The first imaging module is configured to image according to the selected original pixel information.

The first imaging module further includes a first generating unit and a first processing unit.

The first generating unit is configured to generate a first image according to the synthesized pixel information obtained by each execution.

The first processing unit is configured to perform a synthesizing and noise-reduction operation on at least two first images generated by at least two executions.

In an implementation, the device 100 for imaging controlling further includes a second controlling module, a second processing module, and a second outputting module.

The second controlling module is configured to control the pixel-unit array to output multiple pieces of original pixel information in conditions of same exposure time, in response to the exposure ratio in the shooting scene smaller than or equal to the first exposure-ratio threshold and the brightness in the shooting scene larger than the brightness threshold.

The second processing module is configured to obtain the synthesized pixel information by calculating an average value of the multiple pieces of original pixel information in each photosensitive pixel unit, where each photosensitive pixel unit corresponds to one piece of synthesized pixel information.

The second outputting module is configured to output a synthesized image according to the synthesized pixel information.

In an implementation, the device 100 for imaging controlling further includes a third controlling module, a third processing module, and a third outputting module.

The third controlling module is configured to execute, multiple times, controlling the pixel-unit array to output the multiple pieces of original pixel information in conditions of same exposure time, in response to the exposure ratio in the shooting scene smaller than or equal to the first exposure-ratio threshold and the brightness in the shooting scene smaller than the brightness threshold.

The third processing module is configured to obtain the synthesized pixel information by calculating the average value of the multiple pieces of original pixel information in each photosensitive pixel unit obtained by each execution.

The third outputting module is configured to output the synthesized image according to the synthesized pixel information.

The third outputting module further includes a second generating unit, a second processing unit, and a second outputting unit.

The second generating unit is configured to generate a second image according to the synthesized pixel information obtained by each execution.

The second processing unit is configured to perform a synthesizing and noise-reduction processing on multiple second images generated by multiple executions.

The second outputting unit is configured to output an image obtained by performing the synthesizing and noise-reduction processing on the multiple second images.

In an implementation, the device 100 for imaging controlling further includes a first determining module configured to determine whether the exposure ratio in the shooting scene is larger than a second exposure-ratio threshold (the second exposure-ratio is smaller than the first exposure-ratio threshold), and/or determine whether target processing duration in the shooting scene is longer than a duration threshold.

In an implementation, the device 100 for imaging controlling further includes a second imaging module configured to output a restored image according to restored pixel information corresponding to the synthesized pixel information, when the exposure ratio in the shooting scene is smaller than the second exposure-ratio threshold and the target processing duration is shorter than or equal to the duration threshold.

The second imaging module further includes a third determining unit and a third outputting unit.

The third determining unit is configured to determine at least two pieces of restored pixel information corresponding to each piece of synthesized pixel information, where each piece of synthesized pixel information corresponds to one color, and at least two pieces of restored pixel information determined corresponding to each piece of synthesized pixel information correspond to at least two colors.

The third outputting unit is configured to output the restored image according to each piece of restored pixel information.

In an implementation, the device for imaging controlling further includes an obtaining module configured to obtain an ISO value or exposure time in the shooting scene, and a second determining module configured to determine that the shooting scene is the bright environment, when the ISO value or the exposure time in the shooting scene is smaller than a corresponding first parameter threshold.

According to the device for imaging controlling in the implementation of the present disclosure, when the brightness in the shooting scene is larger than the brightness threshold, and the exposure ratio of the long-exposure pixel in the shooting scene to the short-exposure pixel in the shooting scene is larger than the first exposure-ratio threshold, control, in each photosensitive pixel unit, the long-exposure pixel, the medium-exposure pixel, and the short-exposure pixel to output the original pixel information in conditions of different exposure time correspondingly. In each photosensitive pixel unit, select the original pixel information of the long-exposure pixel, the original pixel information of the short-exposure pixel, or the original pixel information of the medium-exposure pixel, and image according to the selected original pixel information. Therefore, by controlling the pixel-unit array to output original pixel information in conditions of different exposure time correspondingly and synthesizing the original pixel information, a high-dynamic-range image is output, which improves imaging effect, image quality, and user's shooting experience.

What needs to be illustrated is that illustration of the above-mentioned method for imaging controlling can also be applied to the device for imaging controlling in the implementation, which will not be repeated herein.

To realize the above implementations, the present disclosure further provides an electronic device. The electronic device includes a memory, a processor, and at least one computer program stored in the memory and capable of being run in the processor. The processor executes the computer program to perform the method for imaging controlling in the above-mentioned implementation.

To realize the above-mentioned implementations, the present disclosure further provides a non-transitory computer-readable storage medium storing at least one computer program. The at least one computer program, when executed by a processor, is operable with the processor to perform the method for imaging controlling in the above-mentioned implementation.

Figure 9:
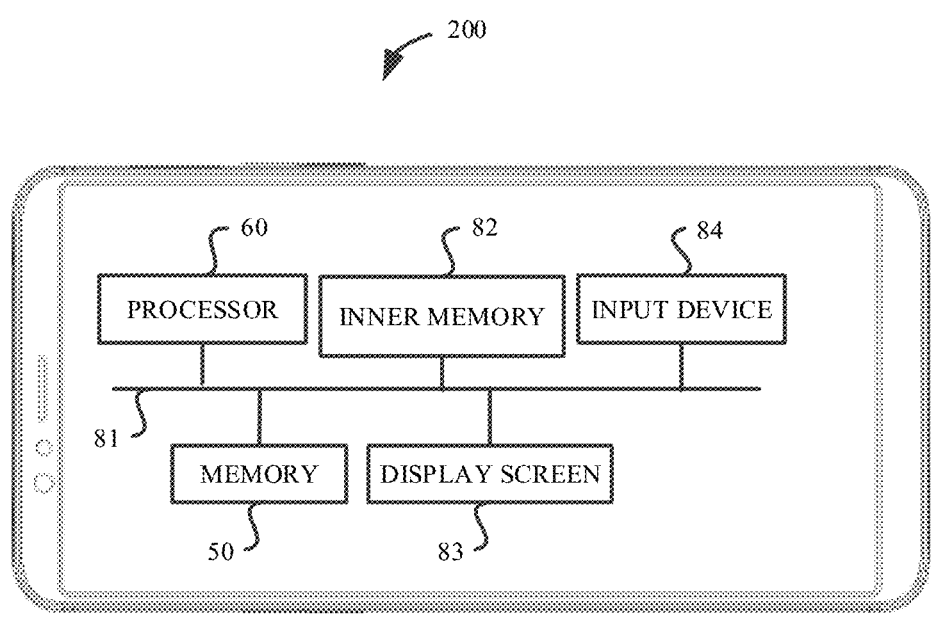
FIG. 9 is a schematic block diagram illustrating an electronic device according to an implementation of the present disclosure.

As illustrated in FIG. 9, the present disclosure further provides an electronic device 200. The electronic device 200 includes a memory 50 and a processor 60. The memory 50 stores at least one computer-readable instruction. The computer-readable instruction, when executed by the processor 60, is operable with the processor 60 to perform the method for imaging controlling in the above-mentioned implementation.

FIG. 9 is a schematic structural diagram illustrating an internal structure of the electronic device 200 in an implementation. The electronic device 200 includes the processor 60, the memory 50 (for example, a non-volatile storage medium), an internal memory 82, a display screen 83, and an input device 84 that are coupled together via a system bus 81. The memory 50 of the electronic device 200 stores an operating system and computer readable instructions. The computer-readable instructions can be executed by the processor 60 to implement the method for imaging controlling in the implementations of the present disclosure. The processor 60 is configured to provide calculation and control capabilities, to support the operation of the electronic device 200. The internal memory 82 of the electronic device 200 provides an environment for the execution of the computer readable instructions in the memory 50. The display screen 83 of the electronic device 200 may be a liquid crystal display screen or an electronic ink display screen, or the like, and the input device 84 may be a touch layer on the display screen 83, or may be a button, a trackball or a touch panel disposed on a housing of the electronic device 200, and may also be an external keyboard, touchpad, or mouse. The electronic device 200 may be a mobile phone, a tablet computer, a notebook computer, a personal digital assistant (PDA), or a wearable device (such as a smart bracelet, a smart watch, a smart helmet, and a pair of smart glasses). Those skilled in the art can understand that the structure illustrated in FIG. 9 is merely a schematic structure related to the solution of the present disclosure, and does not constitute a limitation on the electronic device 200 that can provide the solution of the present disclosure. The electronic device 200 may include more or fewer components than illustrated in FIG. 9, or a combination of certain components, or have a different component arrangement.

Figure 10:
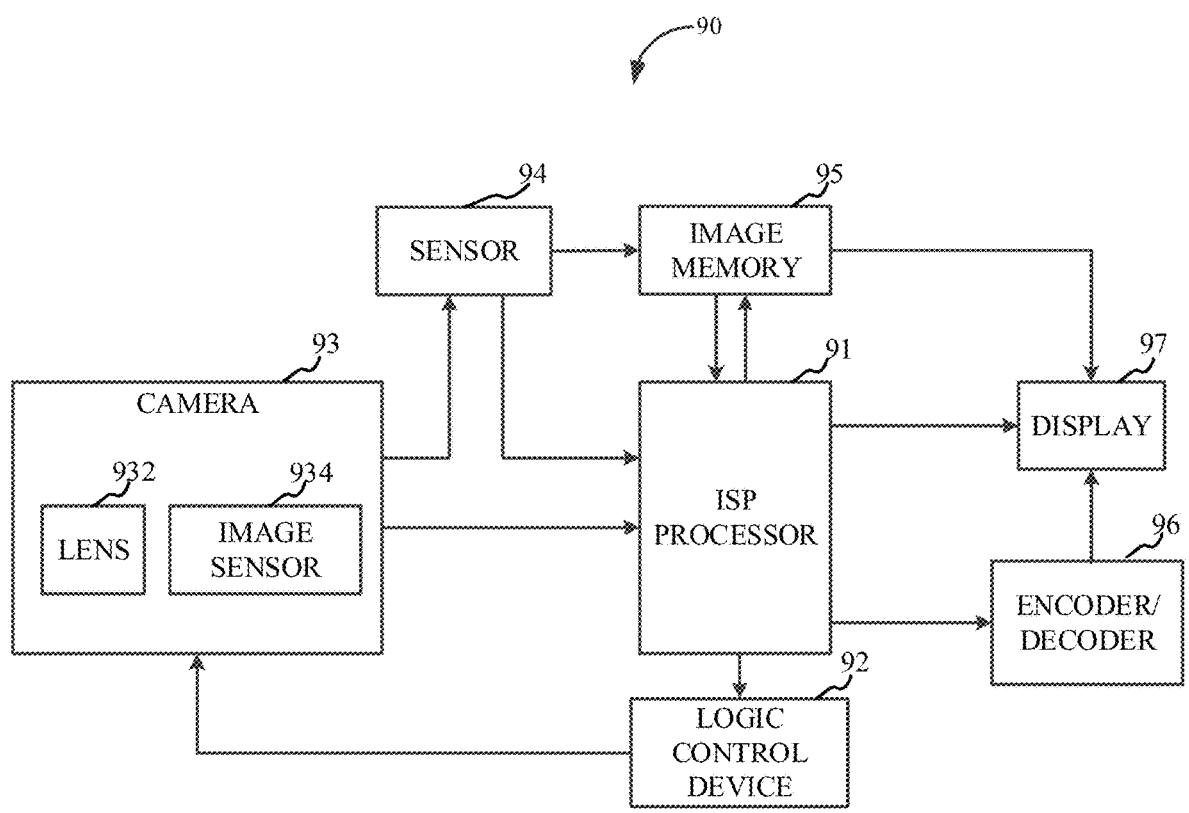
FIG. 10 is a schematic block diagram illustrating an image processing circuit according to an implementation of the present disclosure.

Referring to FIG. 10, the electronic device 200 in the implementation of the present disclosure includes an image processing circuit 90. The image processing circuit 90 can be implemented by hardware and/or software components, including various processing units defining image signal processing (ISP) pipelines. FIG. 10 is a schematic diagram illustrating the image processing circuit 90 in an implementation. As illustrated in FIG. 10, for ease of description, only various aspects of the image processing technology related to the implementation of the present disclosure are illustrated.

As illustrated in FIG. 10, the image processing circuit 90 includes an ISP processor 91 (the ISP processor 91 may be the processor 60) and a logic control device 92. Image data captured by the camera 93 is first processed by the ISP processor 91, and the ISP processor 91 analyzes the image data to obtain image statistical information that can be used to determine one or more control parameters of the camera 93. The camera 93 may include one or more lenses 932 and an image sensor 934. The image sensor 934 may include a color filter array (such as a Bayer filter). The image sensor 934 can obtain light intensity and wavelength information captured by each imaging pixel, and provide a set of raw image data that can be processed by the ISP processor 91. The sensor 94 (such as a gyroscope sensor) can provide the collected image processing parameters (such as anti-shake parameters) to the ISP processor 91 based on a type of an interface of the sensor 94. The interface of the sensor 94 may be a standard mobile imaging architecture (SMIA) interface, other serial or parallel camera interface, or a combination of the above interfaces.

In addition, the image sensor 934 can also send the raw image data to the sensor 94. The sensor 94 can provide the raw image data to the ISP processor 91 based on the type of the interface of the sensor 94, or the sensor 94 can store the raw image data in an image memory 95.

The ISP processor 91 processes the raw image data pixel by pixel in multiple formats. For example, each image pixel may have a bit depth of 8, 10, 12, or 14 bits, and the ISP processor 91 can perform one or more image processing operations on the raw image data and collect statistical information about the image data. The image processing operations can be performed with the same or different bit depth accuracies.

The ISP processor 91 can also receive image data from the image memory 95. For example, the interface of the sensor 94 sends the raw image data to the image memory 95, and the raw image data in the image memory 95 is then provided to the ISP processor 91 for processing. The image memory 95 may be the memory 50, a part of the memory 50, a storage device, or an independent dedicated memory in the electronic device, and may include direct memory access (DMA) features.

When receiving the raw image data from the interface of the image sensor 934 interface or the interface of the sensor 94 or the image memory 95, the ISP processor 91 can perform one or more image processing operations, such as temporal filtering. The processed image data can be sent to the image memory 95 for additional processing before being displayed. The ISP processor 91 receives the processed data from the image memory 95, and performs image data processing on the processed data in the original domain and the RGB and YCbCr color spaces. The image data processed by the ISP processor 91 can be output to a display 97 (the display 97 may include the display screen 83) for viewing by a user and/or further processing by a graphics engine or a graphics processing unit (GPS). In addition, the output of the ISP processor 91 can also be sent to the image memory 95, and the display 97 can read image data from the image memory 95. In one implementation, the image memory 95 may be configured to implement one or more frame buffers. In addition, the output of the ISP processor 91 may be sent to an encoder/decoder 96 in order to encode/decode image data. The encoded image data can be stored and decompressed before being displayed on the display 97. The encoder/decoder 96 may be implemented by a central processing unit (CPU) or GPU or a coprocessor.

The statistical data determined by the ISP processor 91 can be sent to the logic control device 92. For example, the statistical data may include statistical information of the image sensor 934, such as automatic exposure, automatic white balance, automatic focus, flicker detection, black-level compensation, and shading correction of the lens 932. The logic control device 92 may include a processing element and/or microcontroller that executes one or more routines (such as firmware), where the one or more routines can determine control parameters of the camera 93 and the ISP processor 91 based on the received statistical data. For example, the control parameters of the camera 93 may include control parameters of the sensor 94 (such as gain, integration time for exposure control, anti-shake parameters, etc.), camera-flash control parameters, control parameters of the lens 932 (such as focus or zoom focal length), or a combination thereof. The control parameters of the ISP processor 91 may include gain levels and color correction matrices for automatic white balance and color adjustment (for example, during RGB processing), and shading correction parameters of the lens 932.

The reference term "an implementation", "some implementations", "an example", "a specific example", or "some examples" referred to in the specification means that a particular feature, structure, material, or characteristic described in conjunction with the implementation or examples may be contained in at least one implementation or example of the present disclosure. In this specification, the schematic representations of the above terms are not necessary for the same implementation or example. Furthermore, the particular feature, structure, material, or characteristic described may be properly combined in any one or more implementations or examples. In addition, those skilled in the art can perform a combination on different implementations or examples and features of different implementations or examples described in this specification without mutual contradiction.

In addition, terms "first", "second", and the like are only used for description and cannot be understood as explicitly or implicitly indicating relative importance or implicitly indicating the number of technical features referred to herein. Therefore, features restricted by the terms "first", "second", and the like can explicitly or implicitly include at least one of the features. In the context of the present disclosure, unless stated otherwise, "multiple", "a plurality of", or "a number of" refers to "at least two", such as two, three, and the like.

Any process or method illustrated in a flow chart or herein in other manners can be understood as a module, a fragment, or a portion of codes that include one or more executable instructions for implementing a particular logical function or operations of a process. The scope of the implementations of the present disclosure includes additional implementations in which the functions may be performed out of the order illustrated or discussed. For example, the involved functions can be performed in a substantially simultaneous manner or in the reverse order, which should be understood by those skilled in the art.

Logics and/or steps illustrated in the flow charts or described herein in other way, can be considered as a sequencing table of executable instructions for realizing logical functions, which can be embodied in any computer-readable medium to be used by an instruction execution system, a device, or an apparatus (e.g., a computer-based system, a system including a processor, or other systems that can read and execute an instruction from the instruction execution system, device, or apparatus), or to be used in combination with the instruction execution system, device, or apparatus. In terms of this specification, the "computer-readable medium" may be any device that includes or stores communicating programs, propagation or transmission programs used by the instruction execution system, device, or apparatus or used in combination with the instruction execution system, device or, apparatus. In particular, the computer-readable medium (illustrated in a non-exhaustive list) may include: an electrical connection part (electronic device) having one or more wires, a portable computer disk cartridge (magnetic device), a random access memory (RAM), a read-only memory (ROM), an erasable programmable read-only memory (EPROM or flash memory), an optical fiber device, and a portable compact disc read-only memory (CDROM). In addition, the computer-readable medium even can be a paper or other appropriate medium on which the programs are printed, where the programs can be electronically obtained as follows. An optical scanning is conducted on the paper or other medium, followed by editing, interpreting, or processing in other appropriate mode. The programs are stored in a computer memory.

It should be understood that all parts of the implementations can be realized via hardware, software, firmware, or a combination thereof. In the above implementations, multiple operations or methods can be implemented by software or firmware that is stored in a memory and executed by a proper instruction execution system. For example, if the multiple operations or methods are implemented by hardware, as in another implementation, the multiple operations or methods can be implemented with any of the following technologies or a combination thereof known in the art: a discrete logic circuit with a logic gate circuit for realizing logic functions on data signals, a dedicated integrated circuit with an appropriate combined logic gate circuit, a programmable gate array (PGA), a field programmable gate array (FPGA), and so on.

It should be understood by those of ordinary skill in the art that all or part of operations of the method of the above implementations can be implemented by instructing relevant hardware via a program, the program can be stored in a computer-readable storage medium, and when the program is executed, one of operations or a combination of the operations of the method implementations is executed.

Moreover, the functional units in the implementations may be integrated in one processing module, or the units separately and physically exist, or two or more units are integrated in one module. The above-mentioned integrated module may be realized in the form of hardware or a software functional module. When the integrated module is realized in the form of a software functional module and sold or used as an independent product, it can also be stored in the computer-readable storage medium.

The aforementioned storage medium may be a ROM, a magnetic disc, an optical disc, or the like.

Although the implementations of the present disclosure are illustrated and described above, it should be understood that the implementations are exemplary rather than limiting the present disclosure. Various changes, modifications, substitutions, and variations could be made to the implementations by those of ordinary skilled in the art within the scope of the disclosure.

What is claimed is:

1. A method for imaging controlling, the method being applied to an electronic device, the electronic device comprising a pixel-unit array, the pixel-unit array comprising a plurality of photosensitive pixel units, each photosensitive pixel unit comprising at least one long-exposure pixel, at least one medium-exposure pixel, and at least one short-exposure pixel, the method comprising:
    determining whether an exposure ratio of the at least one long-exposure pixel in a shooting scene to the at least one short-exposure pixel in the shooting scene is larger than a first exposure-ratio threshold, in response to brightness in the shooting scene larger than a brightness threshold;
    in each photosensitive pixel unit, controlling the at least one long-exposure pixel, the at least one medium-exposure pixel, and the at least one short-exposure pixel to output original pixel information in conditions of different exposure time correspondingly, in response to the exposure ratio of the at least one long-exposure pixel in the shooting scene to the at least one short-exposure pixel in the shooting scene larger than the first exposure-ratio threshold;
    in each photosensitive pixel unit, selecting the original pixel information of the at least one long-exposure pixel in response to the original pixel information of the at least one long-exposure pixel being less than an upper limit, selecting the original pixel information of the at least one medium-exposure pixel in response to the original pixel information of the at least one medium-exposure pixel being less than the upper limit, and selecting the original pixel information of the at least one short-exposure pixel in response to the original pixel information of the at least one short-exposure pixel being less than the upper limit; and
    imaging according to the selected original pixel information.

2. The method for imaging controlling of claim 1, wherein long exposure time of the at least one long-exposure pixel is longer than medium exposure time of the at least one medium-exposure pixel, and the medium exposure time of the at least one medium-exposure pixel is longer than short exposure time of the at least one short-exposure pixel;
    imaging according to the selected original pixel information, comprises:
        for each photosensitive pixel unit, obtaining synthesized pixel information based on the selected original pixel information, an exposure ratio of the long exposure time to the medium exposure time, an exposure ratio of the medium exposure time to the short exposure time, and an exposure ratio of the long exposure time to the short exposure time; and
        outputting a synthesized image according to the synthesized pixel information.

3. The method for imaging controlling of claim 2 further comprising;
    executing, multiple times, in each photosensitive pixel unit, controlling the at least one long-exposure pixel, the at least one medium-exposure pixel, and the at least one short-exposure pixel to output the original pixel information in conditions of different exposure time correspondingly, in response to the brightness in the shooting scene smaller than the brightness threshold;
    in each photosensitive pixel unit, selecting the original pixel information of the at least one long-exposure pixel, the original pixel information of the at least one medium-exposure pixel, or the original pixel information of the at least one short-exposure pixel, in response to each execution of controlling, in each photosensitive pixel unit, the at least one long-exposure pixel, the at least one medium-exposure pixel, and the at least one short-exposure pixel to output the original pixel information in conditions of different exposure time correspondingly; and outputting the synthesized image according to the synthesized pixel information, comprising:
generating an image according to the synthesized pixel information obtained by each execution;
performing a synthesizing and noise-reduction processing on at least two images generated by at least two executions to obtain the synthesized image; and
outputting the synthesized image.

4. The method for imaging controlling of claim 1 further comprising:
controlling the pixel-unit array to output a plurality of pieces of the original pixel information in conditions of same exposure time, in response to the exposure ratio in the shooting scene smaller than or equal to the first exposure-ratio threshold and the brightness in the shooting scene larger than the brightness threshold;
obtaining synthesized pixel information by calculating an average value of the plurality of pieces of the original pixel information in each photosensitive pixel unit; and
outputting a synthesized image according to the synthesized pixel information.

5. The method for imaging controlling of claim 4 further comprising:
executing, multiple times, controlling the pixel-unit array to output the plurality of pieces of the original pixel information in conditions of same exposure time, in response to the exposure ratio in the shooting scene smaller than or equal to the first exposure-ratio threshold and the brightness in the shooting scene smaller than the brightness threshold, wherein at least two kinds of exposure time are adopted during multiple executions;
obtaining the synthesized pixel information by calculating the average value of the plurality of pieces of the original pixel information in each photosensitive pixel unit, in response to each execution of controlling the pixel-unit array to output the plurality of pieces of the original pixel information in conditions of same exposure time; and
outputting the synthesized image according to the synthesized pixel information, comprising:
generating an image according to the synthesized pixel information obtained by each execution;
performing a synthesizing and noise-reduction processing on a plurality of images generated by multiple executions to obtain the synthesized image; and
outputting the synthesized image.

6. The method for imaging controlling of claim 4 further comprising:
prior to controlling the pixel-unit array to output the plurality of pieces of the original pixel information in conditions of the same exposure time:
determining whether the exposure ratio in the shooting scene is larger than a second exposure-ratio threshold, wherein the second exposure-ratio threshold is smaller than the first exposure-ratio threshold; and
determining whether target processing duration in the shooting scene is longer than a duration threshold;
the method further comprising:
outputting a restored image according to restored pixel information corresponding to the synthesized pixel information, in response to the exposure ratio in the shooting scene smaller than the second exposure-ratio threshold and the target processing duration in the shooting scene shorter than or equal to the duration threshold.

7. The method for imaging controlling of claim 6, wherein outputting the restored image according to the restored pixel information corresponding to the synthesized pixel information, comprises:
determining at least two pieces of the restored pixel information corresponding to each piece of the synthesized pixel information, wherein each piece of the synthesized pixel information corresponds to one color, and at least two pieces of the restored pixel information determined corresponding to each piece of the synthesized pixel information correspond to at least two colors; and
outputting the restored image according to each determined piece of the restored pixel information.

8. The method for imaging controlling of claim 1 further comprising:
obtaining an International Organization for Standardization (ISO) value or exposure time in the shooting scene; and
determining that the brightness in the shooting scene is larger than the brightness threshold, in response to the ISO value or the exposure time in the shooting scene smaller than a corresponding parameter threshold.

9. An electronic device comprising:
a memory configured to store at least one computer program; and
a processor;
the at least one computer program, when executed, is operable with the processor to:
determine whether an exposure ratio of at least one long-exposure pixel of the electronic device in a shooting scene to at least one short-exposure pixel of the electronic device in the shooting scene is larger than a first exposure-ratio threshold, in response to brightness in the shooting scene larger than a brightness threshold;
in each photosensitive pixel unit of the electronic device, control the at least one long-exposure pixel, at least one medium-exposure pixel, and the at least one short-exposure pixel to output original pixel information in conditions of different exposure time correspondingly, in response to the exposure ratio of the at least one long-exposure pixel in the shooting scene to the at least one short-exposure pixel in the shooting scene larger than the first exposure-ratio threshold;
in each photosensitive pixel unit, select the original pixel information of the at least one long-exposure pixel in response to the original pixel information of the at least one long-exposure pixel being less than an upper limit, select the original pixel information of the at least one medium-exposure pixel in response to the original pixel information of the at least one medium-exposure pixel being less than the upper limit, and select the original pixel information of the at least one short-exposure pixel in response to the original pixel information of the at least one short-exposure pixel being less than the upper limit; and
image according to the selected original pixel information.

10. The electronic device of claim 9, wherein long exposure time of the at least one long-exposure pixel is longer than medium exposure time of the at least one medium-exposure pixel, and the medium exposure time of the at least one medium-exposure pixel is longer than short exposure time of the at least one short-exposure pixel, and the at least one computer program operable with the processor to image according to the selected original pixel information is operable with the processor to:
  for each photosensitive pixel unit, obtain synthesized pixel information based on the selected original pixel information, an exposure ratio of the long exposure time to the medium exposure time, an exposure ratio of the medium exposure time to the short exposure time, and an exposure ratio of the long exposure time to the short exposure time; and
  output a synthesized image according to the synthesized pixel information.

11. The electronic device of claim 10, wherein the at least one computer program, when executed, is further operable with the processor to:
  execute, multiple times, in each photosensitive pixel unit, controlling the at least one long-exposure pixel, the at least one medium-exposure pixel, and the at least one short-exposure pixel to output the original pixel information in conditions of different exposure time correspondingly, in response to the brightness in the shooting scene smaller than the brightness threshold;
  in each photosensitive pixel unit, select the original pixel information of the at least one long-exposure pixel, the original pixel information of the at least one medium-exposure pixel, or the original pixel information of the at least one short-exposure pixel, in response to each execution of controlling, in each photosensitive pixel unit, the at least one long-exposure pixel, the at least one medium-exposure pixel, and the at least one short-exposure pixel to output the original pixel information in conditions of different exposure time correspondingly; and
  the at least one computer program operable with the processor to output the synthesized image according to the synthesized pixel information is operable with the processor to:
    generate an image according to the synthesized pixel information obtained by each execution;
    perform a synthesizing and noise-reduction processing on at least two images generated by at least two executions to obtain the synthesized image; and
    output the synthesized image.

12. The electronic device of claim 9, wherein the at least one computer program, when executed, is further operable with the processor to:
  control a pixel-unit array comprising a plurality of the photosensitive pixel units to output a plurality of pieces of the original pixel information in conditions of same exposure time, in response to the exposure ratio in the shooting scene smaller than or equal to the first exposure-ratio threshold and the brightness in the shooting scene larger than the brightness threshold;
  obtain synthesized pixel information by calculating an average value of the plurality of pieces of the original pixel information in each photosensitive pixel unit; and
  output a synthesized image according to the synthesized pixel information.

13. The electronic device of claim 12, wherein the at least one computer program, when executed, is further operable with the processor to:
  execute, multiple times, controlling the pixel-unit array to output the plurality of pieces of the original pixel information in conditions of same exposure time, in response to the exposure ratio in the shooting scene smaller than or equal to the first exposure-ratio threshold and the brightness in the shooting scene smaller than the brightness threshold, wherein at least two kinds of exposure time are adopted during multiple executions;
  obtain the synthesized pixel information by calculating the average value of the plurality of pieces of the original pixel information in each photosensitive pixel unit, in response to each execution of controlling the pixel-unit array to output the plurality of pieces of the original pixel information in conditions of same exposure time; and
  the at least one computer program operable with the processor to output the synthesized image according to the synthesized pixel information is operable with the processor to:
    generate an image according to the synthesized pixel information obtained by each execution;
    perform a synthesizing and noise-reduction processing on a plurality of images generated by multiple executions to obtain the synthesized image; and
    output the synthesized image.

14. The electronic device of claim 12, wherein the at least one computer program, when executed, is further operable with the processor to:
  determine whether the exposure ratio in the shooting scene is larger than a second exposure-ratio threshold, wherein the second exposure-ratio threshold is smaller than the first exposure-ratio threshold;
  determine whether target processing duration in the shooting scene is longer than a duration threshold; and
  output a restored image according to restored pixel information corresponding to the synthesized pixel information, in response to the exposure ratio in the shooting scene smaller than the second exposure-ratio threshold and the target processing duration in the shooting scene shorter than or equal to the duration threshold.

15. The electronic device of claim 14, wherein the at least one computer program operable with the processor to output the restored image according to the restored pixel information corresponding to the synthesized pixel information is operable with the processor to:
  determine at least two pieces of the restored pixel information corresponding to each piece of the synthesized pixel information, wherein each piece of the synthesized pixel information corresponds to one color, and at least two pieces of the restored pixel information determined corresponding to each piece of the synthesized pixel information correspond to at least two colors; and
  output the restored image according to each determined piece of the restored pixel information.

16. The electronic device of claim 9, wherein the at least one computer program, when executed, is further operable with the processor to:
  obtain an International Organization for Standardization (ISO) value or exposure time in the shooting scene; and
  determine that the brightness in the shooting scene is larger than the brightness threshold, in response to the ISO value or the exposure time in the shooting scene smaller than a corresponding parameter threshold.

17. A non-transitory computer-readable storage medium, being configured to store at least one computer program;
  the at least one computer program, when executed, being operable with a processor of an electronic device to:

determine whether an exposure ratio of at least one long-exposure pixel of the electronic device in a shooting scene to at least one short-exposure pixel of the electronic device in the shooting scene is larger than a first exposure-ratio threshold, in response to brightness in the shooting scene larger than a brightness threshold;

in each photosensitive pixel unit of the electronic device, control the at least one long-exposure pixel, at least one medium-exposure pixel, and the at least one short-exposure pixel to output original pixel information in conditions of different exposure time correspondingly, in response to the exposure ratio of the at least one long-exposure pixel in the shooting scene to the at least one short-exposure pixel in the shooting scene larger than the first exposure-ratio threshold;

in each photosensitive pixel unit, select the original pixel information of the at least one long- exposure pixel in response to the original pixel information of the at least one long-exposure pixel being less than an upper limit, select the original pixel information of the at least one medium-exposure pixel in response to the original pixel information of the at least one medium-exposure pixel being less than the upper limit, and select the original pixel information of the at least one short-exposure pixel in response to the original pixel information of the at least one short-exposure pixel being less than the upper limit; and image according to the selected original pixel information.

18. The non-transitory computer-readable storage medium of claim 17, wherein long exposure time of the at least one long-exposure pixel is longer than medium exposure time of the at least one medium-exposure pixel, and the medium exposure time of the at least one medium-exposure pixel is longer than short exposure time of the at least one short-exposure pixel, and the at least one computer program operable with the processor to image according to the selected original pixel information is operable with the processor to:

for each photosensitive pixel unit, obtain synthesized pixel information based on the selected original pixel information, an exposure ratio of the long exposure time to the medium exposure time, an exposure ratio of the medium exposure time to the short exposure time, and an exposure ratio of the long exposure time to the short exposure time; and output a synthesized image according to the synthesized pixel information.

19. The non-transitory computer-readable storage medium of claim 18, wherein the at least one computer program, when executed, is further operable with the processor to;

execute, multiple times, in each photosensitive unit, controlling the at least one long-exposure pixel, the at least one medium-exposure pixel, and the at least one short-exposure pixel to output the original pixel information in conditions of different exposure time correspondingly, in response to the brightness in the shooting scene smaller than the brightness threshold;

in each photosensitive pixel unit, select the original pixel information of the at least one long-exposure pixel, the original pixel information of the at least one medium-exposure pixel, or the original pixel information of the at least one short-exposure pixel, in response to each execution of controlling, in each photosensitive pixel unit, the at least one long-exposure pixel, the at least one medium-exposure pixel, and the at least one short-exposure pixel to output the original pixel information in conditions of different exposure time correspondingly; and the at least one computer program operable with the processor to output the synthesized image according to the selected original pixel information is operable with the processor to:

generate an image according to the synthesized pixel information obtained by each execution;

perform a synthesizing and noise-reduction processing on at least two images generated by at least two executions to obtain the synthesized image; and output the synthesized image.

20. The non-transitory computer-readable storage medium of claim 17, wherein the at least one computer program, when executed, is further operable with the processor to:

control a pixel-unit array comprising a plurality of the photosensitive pixel units to output a plurality of pieces of the original pixel information in conditions of same exposure time, in response to the exposure ratio in the shooting scene smaller than or equal to the first exposure-ratio threshold and the brightness in the shooting scene larger than the brightness threshold;

obtain synthesized pixel information by calculating an average value of the plurality of pieces of the original pixel information in each photosensitive pixel unit; and output a synthesized image according to the synthesized pixel information.

* * * * *